Aug. 8, 1933.  G. A. GEMMER  1,921,156
LOST MOTION CONNECTION FOR BRAKE MECHANISMS
Filed Oct. 27, 1927
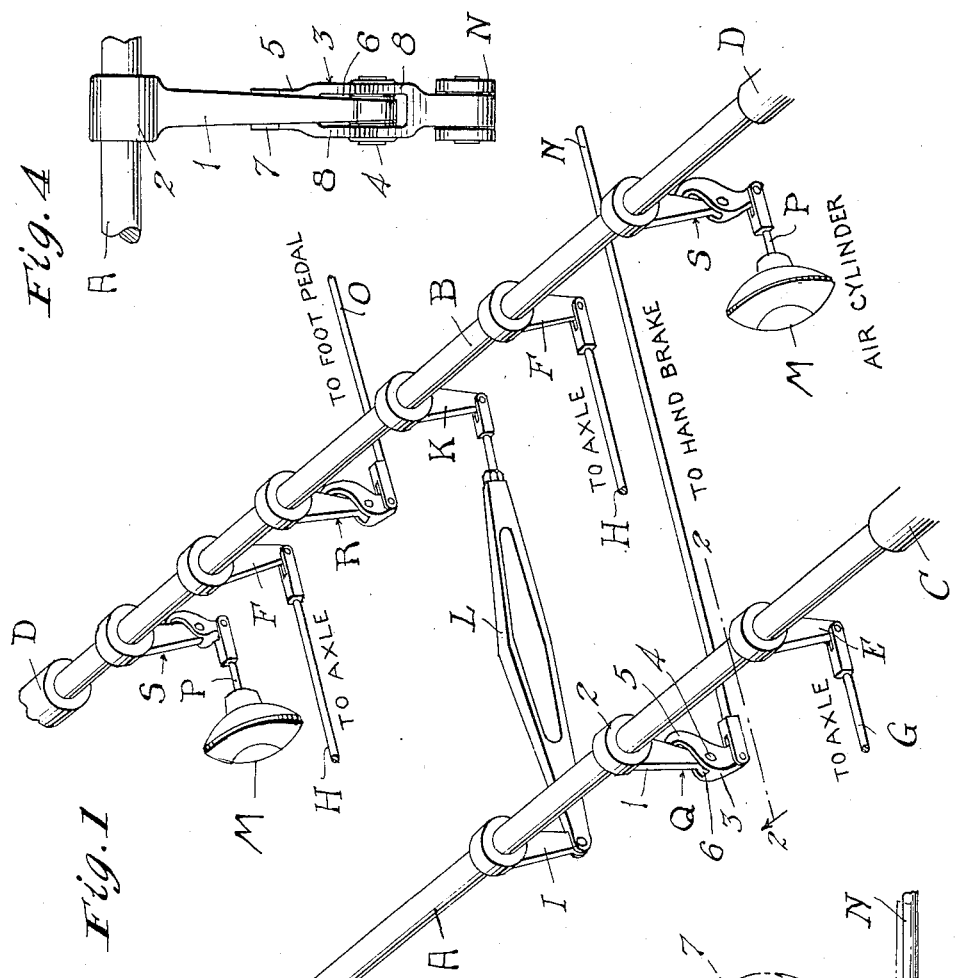
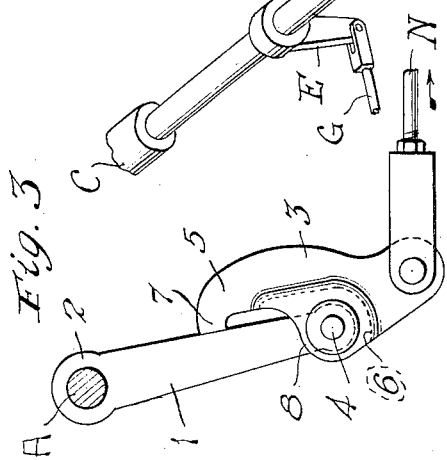
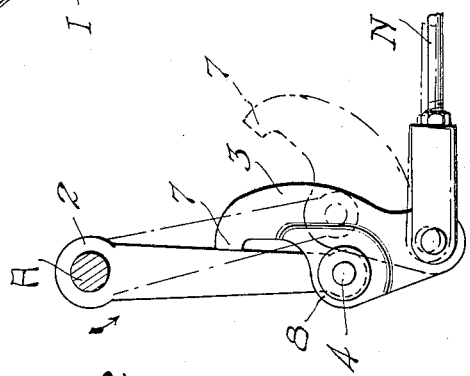
INVENTOR
George A. Gemmer,
BY
Everett H. Cook,
ATTORNEYS.

Patented Aug. 8, 1933

1,921,156

UNITED STATES PATENT OFFICE 1,921,156

LOST-MOTION CONNECTION FOR BRAKE MECHANISMS

George A. Gemmer, Newark, N. J., assignor to Bendix Brake Company, Chicago, Ill., a Corporation of Illinois Application October 27, 1927. Serial No. 229,155

11 Claims. (Cl. 188—106)

This invention relates to brake mechanism of the tandem type wherein several brake operating devices such as a hand lever, a foot pedal and an air cylinder, have lost-motion connections to the same brake gear so that the brakes may be operated by either of the operating devices without movement of the others.

One object of the invention is to provide a novel and improved lost-motion connection which is simple, strong, durable, inexpensive, and can be easily applied to many different brake mechanisms.

Another object is to provide such a lost-motion connection comprising two pivotally connected parts, one fast connected to the brake gear and the other connected to a brake operating device, for example a hand lever, so that upon movement of the brake gear by another operating device the two parts have a relative pivotal movement which prevents movement of the first-mentioned operating device, while when said first-mentioned operating device is actuated to apply the brake, said two parts move together to actuate the brake gear.

Other objects are to provide a lost-motion connection comprising an arm to be fast secured at one end to a brake gear shaft, and a lever pivoted intermediate its ends upon the other end of said arm with one end adapted to bear upon one side of said arm intermediate its ends and the other end to be connected to a brake operating device; to provide such a lost-motion device embodying novel and improved features of construction whereby the strains incident to operating the brake are evenly distributed upon said arm and said lever, and to obtain other advantages and results as will be brought out by the following description.

Referring to the accompanying drawing, in which corresponding and like parts are designated throughout the several views by the same reference characters, Figure 1 is a schematic perspective view of a brake mechanism including my new lost-motion connection, the brakes and other parts unnecessary for an understanding of the invention being omitted;

Figure 2 is a transverse vertical sectional view, taken on the line 2—2 of Figure 1, the lost-motion operation being shown by dot and dash lines;

Figure 3 is a similar view showing the operation of the parts when applying the brake through the lost-motion connection, and Figure 4 is a front elevation of the lost-motion connection as shown in Figure 2.

For the purpose of illustrating the principles of the invention, it is shown applied to a brake gear including two parallel shafts A and B journaled in suitable bearings C and D which may be provided on a vehicle chassis, etc. The brake shafts A and B have the respective crank arms E and F which are connected through links G and H to the brakes (not shown), and the shafts are connected for simultaneous movement by crank arms I and K and a tie-link L. No claim to novelty is made upon this brake gear.

The brake shafts A and B are adapted to be actuated by a hand lever (not shown), a foot pedal (not shown), and air cylinders M, through the respective links N, O and P, and the respective lost-motion connections Q, R and S embodying my invention.

As all of the lost-motion connections Q, R and S are identical, a detail description of one will suffice. This lost-motion connection (see Figures 2, 3 and 4) comprises a crank arm 1 fast connected at one end 2 to the brake shaft A, and pivotally connected at its other end to a lost-motion lever 3 intermediate the ends of the latter as indicated at 4. One end 5 of the lever 3 is adapted to bear against the adjacent side of the crank arm 1 and the other end is connected to the link N which is in turn connected to one of the brake operating devices, so that a pull upon said link in the direction of the arrow in Figure 3 causes the lever 3 and crank arm to move together and rotate the shaft A, while rotation of the shaft A by one of the other brake operating devices causes relative pivotal movement of the crank arm 1 and the lever 3 about the pivot 4 as shown by dot and dash lines in Figure 2 without moving the link N. Therefore, it will be obvious that the brake shafts A and B may be actuated to apply the brakes by either of the brake operating devices, i. e., the hand lever, the foot pedal or the air cylinders, without affecting any of the other operating devices.

Preferably the lost-motion lever 3 has a longitudinal recess 6 forming opposite pivot ears 8 to receive the end of the crank arm 1, and the end 5 of the lever 3 is formed with a bearing boss 7 to provide a small positive contact, whereby the strains incident to operating the brakes are efficiently distributed in the crank arm and the lost-motion lever. The lost-motion connection is therefore simple, strong and durable.

It will be understood that while I have described a now preferred form of my invention, this is primarily for the purpose of illustrating the principles of the invention, and the invention may be embodied in other forms and details of construction without departing from the spirit or scope of the invention. Therefore, I do not desire to be understood as limiting myself except as required by the following claims when construed in the light of the prior art.

Having thus described the invention, what I claim is:

1. In brake mechanism, the combination with a plurality of brake operating devices each ending in a link and a brake gear including a rotatable shaft, of a lost-motion connection for each of said operating devices including two pivotally connected parts one fast connected to said rotatable shaft and the other connected to the respective brake operating link, said parts having portions to engage each other when the operating device is actuated in one direction to cause said parts to move together so as to rotate said shaft in one direction, and said parts being relatively moved about their pivotal connection upon rotation of said shaft in the same direction by another operating device, whereby said brake gear may be actuated by either of said operating devices without movement of the other operating devices.

2. The combination with a brake gear including a rotatable shaft, and a plurality of brake operating devices, of a lost-motion connection between each of said operating devices and said shaft including a crank arm fast connected at one end to said shaft, a lost-motion lever pivotally connected intermediate its ends to said crank arm with one end adapted to bear separably against said crank arm, and means connecting the other end of said lost-motion lever to the respective brake operating device, so that when the operating device is actuated in one direction said end of said lever bears upon said crank arm to cause said crank and said lever to move together and rotate said shaft in one direction, while when said shaft is moved in the same direction by another operating device said crank arm and said lever have pivotal relative movement, whereby said brake gear may be actuated by either of said operating devices without movement of the other operating devices.

3. The combination with a brake gear including a rotatable shaft, and a plurality of brake operating devices each ending in a link, of a lost-motion connection between each of said operating devices and said shaft including two pivotally connected motion transmitting parts one of which is fast connected to said shaft and the other connected to the respective brake operating link, said parts being constructed and arranged to cooperate to transmit motion to said shaft from said operating device upon movement of the latter in one direction and prevent transmission of motion from said shaft to said operating device upon movement of said shaft by another operating device.

4. The combination with a brake gear including a rotatable shaft, and a plurality of brake operating devices each ending in a link, of a lost-motion connection between each of said operating devices and said shaft including parts pivotally connected for limited relative movement, one of which parts is fast connected to said shaft and the other connected to the respective brake operating link, so that when said operating device is actuated in one direction said connection parts move together and rotate said shaft in one direction, while when said shaft is moved in the same direction by another operating device said connection parts have pivotal relative movement, whereby said brake gear may be actuated by either of said operating devices without movement of the other operating devices.

5. The combination with a brake gear including a rotatable shaft, and a plurality of brake operating devices, of a lost-motion connection between each of said operating devices and said shaft including a crank arm and a lost-motion lever pivotally connected for limited relative movement, said crank arm being fast connected to said shaft and said lever connected to the respective brake operating device, so that when said operating device is actuated in one direction said crank arm and said lever move together and rotate said shaft in one direction, while when said shaft is moved in the same direction by another operating device said crank arm and said lever have pivotal relative movement, whereby said brake gear may be actuated by either of said operating devices without movement of the other operating devices.

6. The combination with a brake gear including a rotatable shaft and a plurality of brake operating devices, of a lost-motion connection between each of said operating devices and said shaft including an arm fast on the shaft and a lost-motion lever pivoted upon said arm at a distance from said shaft with one end adapted to bear separably against said arm and the other end connected to the respective brake operating device, so that when said operating device is actuated said end of said lever bears upon said arm to cause said arm and lever to move together and rotate said shaft in one direction, while when said shaft is moved in the same direction by another operating device said arm and lever have a pivotal relative movement.

7. The combination with a brake gear including a rotatable shaft and a plurality of brake operating devices, of a lost-motion connection between each of said operating devices and said shaft including an arm fast on the shaft and a lost-motion lever pivoted to the end of said arm away from the shaft with one end adapted to bear separably against said arm between the point of pivoting and the shaft and the other end connected to the respective brake operating device, so that when said operating device is actuated said end of said lever bears upon said arm to cause said arm and lever to move together and rotate said shaft in one direction, while when said shaft is moved in the same direction by another operating device said arm and lever have a pivotal relative movement.

8. The combination with a brake gear including a rotatable shaft and a plurality of brake operating devices, of a lost-motion connection between each of said operating devices and said shaft including an arm fast on the shaft, a lost-motion lever having intermediate its ends a lateral recess to receive said arm, and means pivotally securing said arm in said recess with one end of said lever adapted to bear separably against said arm and the other end connected to the respective brake operating device, so that when said operating device is actuated said end of said lever bears upon said arm to cause said arm and lever to move together and rotate said shaft in one direction, while when said shaft is moved in the same direction by another operating device said arm and lever have a pivotal relative movement.

9. The combination with a brake gear including a rotatable shaft and a plurality of brake operating devices, of a lost-motion connection between each of said operating devices and said shaft including an arm fast on the shaft and a lost-motion lever pivoted upon said arm at a distance from said shaft, said lever being connected at one end to the respective brake operating device and having at its other end a boss adapted to bear separably against said arm between the point of pivoting and the shaft, so that when said operating device is actuated said end of said lever bears upon said arm to cause said arm and lever to move together and rotate said shaft in one direction, while when said shaft is moved in the same direction by another operating device said arm and lever have a pivotal relative movement.

10. The combination with a brake gear including a rotatable shaft and a plurality of brake operating devices, of a lost motion connection between one of said devices and said shaft including a link associated with said operating device, two motion transmitting parts pivotally connected one upon the other, one of which is fast connected to said shaft and the other of which is connected to the brake operating link, said parts being constructed and arranged to cooperate to transmit motion to said shaft from said operating device upon movement of the latter in one direction and preventing transmission of motion from said shaft to said operating device upon movement of said shaft by another operating device.

11. In brake mechanism, the combination with a plurality of brake operating devices and a brake gear including a rotatable shaft, of a lost motion connection between said shaft and each of said operating devices, including an arm rigidly secured to said shaft, a lever having sides straddling said arm and pivoted thereto and having a part behind the arm engageable with the arm when the lever is moved in one direction, and a connection between each of said levers and one of said operating devices respectively.

GEORGE A. GEMMER.